United States Patent [19]
Lapac et al.

[11] 3,897,535
[45] July 29, 1975

[54] PROCESS FOR FIXTURING A WORKPIECE BY QUENCHING A LIQUID RESIN

[75] Inventors: Edward F. Lapac, West Hartford, Conn.; Joseph F. Miazga, Springfield, Mass.; Irving M. Mittleman, Glastonbury, Conn.

[73] Assignee: United Aircraft Corporation, East Hartford, Conn.

[22] Filed: Aug. 29, 1973

[21] Appl. No.: 392,824

[52] U.S. Cl. .................. 264/268; 264/237; 269/7
[51] Int. Cl.². B29C 13/00; B29C 6/04; B25B 11/00
[58] Field of Search ........... 269/7; 51/277; 264/278, 264/277, 275, 128, 237, 268, 348

[56] References Cited
UNITED STATES PATENTS

| | | | |
|---|---|---|---|
| 3,281,515 | 10/1966 | Schmitz | 264/128 |
| 3,319,289 | 5/1967 | McCormick | 264/138 |
| 3,411,185 | 11/1968 | Pickett | 269/7 |
| 3,526,397 | 9/1970 | Verguson | 264/277 |
| 3,586,559 | 6/1971 | Shepard | 156/247 |

*Primary Examiner*—Robert F. White
*Assistant Examiner*—James B. Lowe
*Attorney, Agent, or Firm*—Stephen E. Revis; Robert C. Walker

[57] ABSTRACT

A process for fixturing a workpiece includes disposing a liquid organic resin workholding material within a workholder around the workpiece and quenching the assembly at between 40°F and 73°F to solidify the workholding material. The cold quench within this particular temperature range gives improved holding strength and reduces shrinkage of the organic workholding material. In one embodiment ceramic stones are heated and disposed within the workholder to heat the workholder and the workpiece prior to pouring the workholding material into the workholder. The stones further increase the holding strength of the workholding material and reduce shrinkage even more.

9 Claims, 2 Drawing Figures

PROCESS FOR FIXTURING A WORKPIECE BY QUENCHING A LIQUID RESIN

BACKGROUND OF THE INVENTION

1. Field of the Invention

This invention relates to fixturing a workpiece.

2. Description of the Prior Art

The prior art is replete with methods and apparatus for properly positioning a workpiece within a workholder so that various operations may be performed on the workpiece. For example, U.S. Pat. No. 3,586,559 to Robert W. Shepard describes a wax composition which is poured in liquid form around a workpiece positioned within a workholder. When the wax composition cools, it hardens thereby holding the workpiece in position within the workholder. In some applications the only work to be done on the workpiece is viewing it under a microscope. Another application is for holding a biopsy specimen for sectioning such as described in the U.S. Pat. No. 3,319,289 to McCormick. In those instances the strength of the solidified wax within the workholder need not be great since the forces on the workpiece are minimal. In the above-mentioned McCormick patent, immediately after the liquid wax is poured around the workpiece within the workholder it is placed in ice water to speed up the solidification process since speed is of the essence when examining a human tissue for a biopsy.

In applications where large forces are exerted on the workpiece such as in the machining of aircraft turbine blade roots and shrouds, waxes have generally proved to be unsatisfactory because of their lower strength and the fact that they shrink away from the workholder as they cool thereby allowing the workpiece to move somewhat during the machining operation. For these reasons a low melting type alloy such as a lead-bismuth-tin composition has been used rather than wax. These alloys are strong and do not shrink, but they present problems of their own which have been plaguing the industry for many years. The major difficulty with the use of these low melting type alloys is that it is very difficult to remove all of the alloy from the workpiece after machining. The small amounts of material often left behind on the workpiece may cause corrosion of the workpiece especially where the workpiece is a turbine blade or vane wherein the operating temperatures are on the order of 2,000°F.

SUMMARY OF THE INVENTION

An object of the present invention is a method for fixturing a workpiece.

Another object of the present invention is a method for securing a workpiece in a workholder or shuttle which holds the workpiece securely even though large forces are exerted on the workpiece.

Another object of the present invention is a method for securing a workpiece within a workholder using materials which are virtually harmless to the workpiece even though traces of these materials remain on the finished workpiece.

Accordingly, the method of the present invention includes the steps of locating the workpiece within a workholder, heating the workpiece and workholder, disposing a liquid organic resin workholding material within the workholder around the workpiece, and quenching the assembly so formed at a temperature of between 40° and 73°F to solidify the workholding material.

In a preferred embodiment of the invention the step of heating the workpiece and workholder is accomplished by disposing heated glass balls or ceramic stones within the workholder and around the workpiece prior to the step of disposing the liquid workholding material within the workholder. These glass bells or ceramic stones not only eliminate the need to use an oven or the like to maintain the temperature of the workholder and the workpiece at above the melting point of the workholding material while pouring the workholding material into the workholder, they also add strength to the workholding material and reduce shrinkage during cooling.

As hereinabove stated, organic resins, such as waxes, have not been used for workholding materials where any substantial amount of strength and locating precision is required in view of the shrinkage problem as the resin solidifies and in view of the relatively low strength characteristics of commercially available resins. The present invention eliminates the shrinkage problem by quickly solidifying the resin with a cold temperature quench. The strength problem has been solved by quenching within a narrow temperature range of between 40° and 73°F. Further strength is gained by the addition of materials such as noncorrosive glass balls or ceramic stones in the manner hereinabove stated.

As hereinabove stated in the description of the prior art, it is difficult to remove all of the workholding material from the finished part after the machining operation. The low melting alloys, such as lead-bismuth-tin compositions of the prior art, may present corrosion problems even when small traces of these materials remain on the finished workpiece. This has been a particular problem with turbine blades and vanes wherein the operating temperatures of these parts are on the order of 2,000°F thereby intensifying the corrosion process. The present invention eliminates this problem since even if traces of the hereinafter to be described workholding material remain on the workpiece they do no harm.

The foregoing and other objects, features and advantages of the present invention will become more apparent in the light of the following detailed description of preferred embodiments thereof as illustrated in the accompanying drawing.

DESCRIPTION OF PREFERRED EMBODIMENTS

Figure 1:
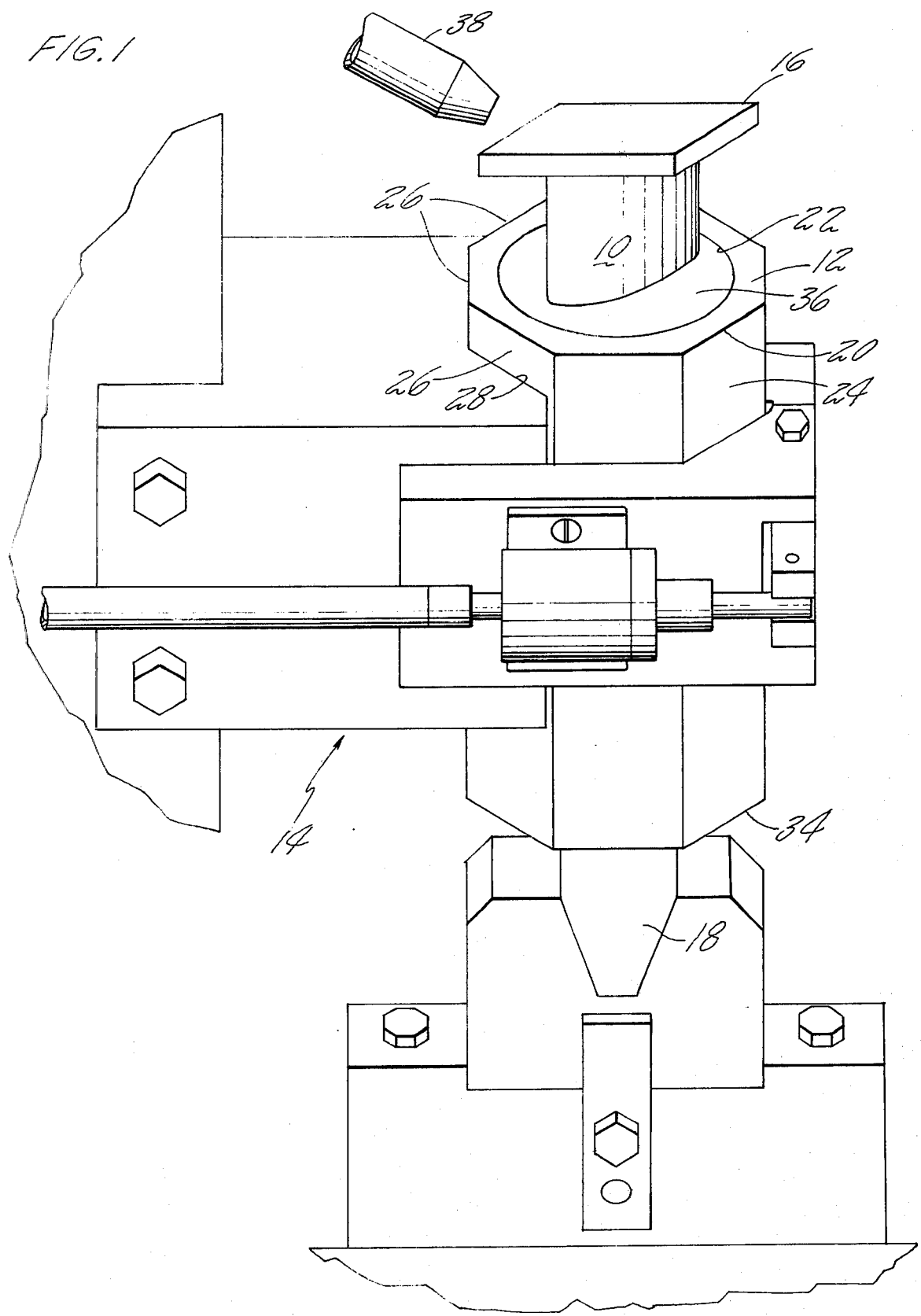
FIG. 1 is a simplified perspective view of apparatus used in the process of the present invention.

The apparatus shown in FIG. 1 is exemplary of the apparatus used in performing one embodiment of the process of the subject invention. This apparatus includes a workpiece 10, a workholder or shuttle 12, and supporting structure generally represented by the numeral 14.

In this exemplary embodiment the workpiece 10 is a turbine blade; and it is desired to finish machine the blade tip shroud 16 and the blade root 18. Generally, the shroud and root are in very rough form at this stage of the operation; and large amounts of material must be removed therefrom to machine them to the proper shape. Furthermore, these parts must be machined to very close tolerances. Thus, parts such as this turbine blade 10 must be held very securely and located precisely with respect to the tool which accomplishes the machining. The blade 10 is precisely located and fixed with respect to a finished surface of the shuttle 12 in a manner hereinafter to be described; the shuttle 12, with the blade 10 secured therein, is then positioned within the cutting machine by properly orienting the finished surface of the shuttle with respect to the cutting tool by methods well known in the art.

FIG. 1 is the apparatus used for precisely positioning the blade 10 within the shuttle 12. The shuttle 12 in this embodiment has an octagonal external surface 20 and a cylindrical internal surface 22 which extends through the shuttle. One or more of the octagonal faces 24 is accurately machined and is a locating surface. In this embodiment the faces 26 are the locating surfaces; they mate with accurately machined surfaces such as the surface 28 of the support structure 14 so that the shuttle 12 is precisely located with respect to the support structure 14. The workpiece or blade 10 is thereupon positioned within the shuttle 12 so that the blade 10 is properly located within the shuttle 12 with respect to the locating faces 26 of the shuttle. A cover (not shown) is then placed over the cylindrical opening in the bottom 34 of the shuttle 12. The cover fits closely around the blade 10 so that the cavity 22 may be filled with a liquid.

A cold quenchable organic resin workholding material is heated until it is liquid and is poured into the cavity 22 of the shuttle 12 which has been heated, along with the blade 10, so that the material will not begin to solidify until the cavity 22 has been filled. After the cavity is filled with the material 36, the shuttle 12 and blade 10 are immediately quenched at a temperature of between 45°F and 70°F for as long as is necessary to solidify the material 36 and to cool down the temperature of the shuttle and the blade 10 so that they do not soften the material after the quenching operation. Generally about 5 to 10 minutes of quench time is necessary, but the exact time is dependent upon the size of the parts, and their original temperature. In this preferred embodiment the quenching is done by simply directing a stream of liquid such as water at the proper temperature over the parts from a nozzle 38. The quenching could, of course, also be accomplished by submerging the parts within a bath of liquid at the proper temperature.

Figure 2:
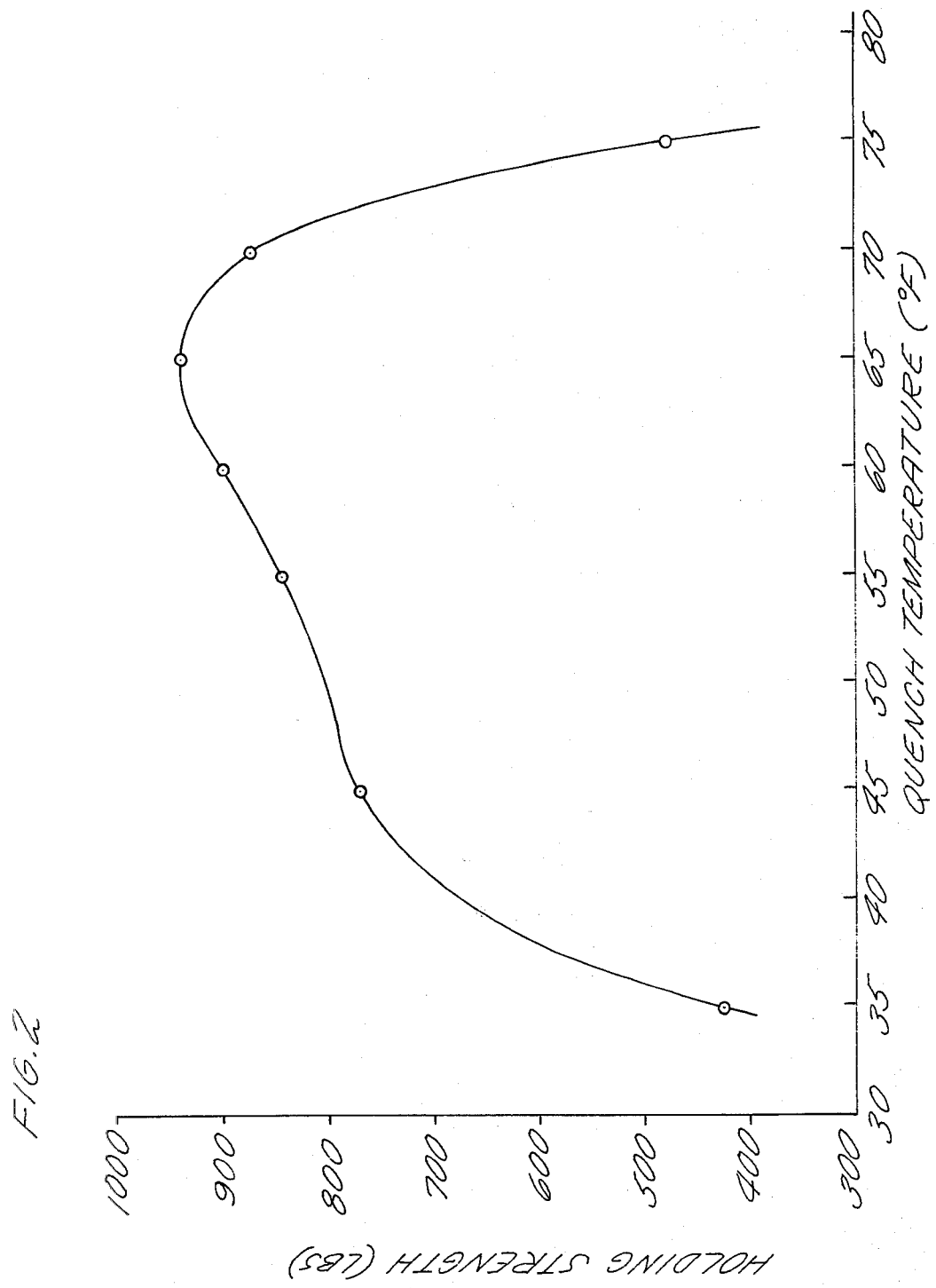
FIG. 2 is a graph representing the data set forth in Table I of the specification.

The term "cold quenchable organic resin workholding material" as used herein and in the claims is defined as any wax or thermoplastic which is solid at room temperature and which exhibits a strength curve of the same general shape as the curve shown in FIG. 2 wherein high strength occurs and shrinkage is low when solidified from the liquid stage by a quench at between 40°F and 73°F. Preferably this workholding material should include no fillers which might be corrosive to the workpiece. In this preferred embodiment a relatively high strength, high melting point (greater than 170°F), noncorrosive, water insoluble, chlorinated diphenol composition wax is used. This was obtained from the Rigidax Division of M. Argueso & Co. Inc. Mamaroneck, NY, and is known in the cataologs of that division as Rigidax WINF Yellow.

In this preferred embodiment the step of heating the shuttle 12 and the blade 10 prior to pouring in the liquid wax is accomplished by filling the cavity 22 with a special filler of ceramic stones heated to approximately 800°F. The stones are large enough so that the wax workholding material will flow evenly down through the stones and fill all the voids. In this regard, symmetrical stones are preferred to give uniformity and to reduce the number of voids within the cavity 22 after the wax is poured. Stones which are too small will pack together and may not permit the wax to flow therethrough; further, they may take up such a large percentage of the volume of the cavity that even if the wax were able to flow through the stones it would not be in sufficient quantity to hold the workpiece securely. In the preferred embodiment the ceramic stones are tetrahedral in shape with 3/16 inch sides. When the cavity 22 is filled with these stones, they take up approximately two-thirds of the space within the cavity. Glass balls have also been used with success.

The term "special filler" as used herein and in the claims is defined as a quantity of noncorrosive, high melting point particles, preferably having a low coefficient of thermal expansion. The term "high melting point" is intended to mean at least high enough so that the filler may be heated to a temperature high enough to heat the workpiece and shuttle to above the melting point of the workholding material without the particles themselves melting. Glass and other ceramics such as aluminum oxide are two examples of materials which may be used as fillers. Some metals may also perform satisfactorily, however, metals generally have a higher coefficient of thermal expansion than ceramics, and for that reason ceramics are preferred. Whatever the material used, the particles should preferably have a maximum dimension of between one-eighth and two-tenths of an inch. Stones or balls of lesser size may, as has already been stated, not permit the proper flow of wax into the cavity 22. Stones or balls of greater size, while they may perform satisfactorily in heating the shuttle and the workpiece, may not add much strength to the solidified composition.

The foregoing step greatly eases the process of heating the shuttle and the workpiece and maintaining the shuttle and workpiece at a high temperature while pouring the workholding material. Furthermore, the special fillers increase the holding power of the wax and aid in eliminating shrinkage during the quench since they accommodate two-thirds of the volume of the cavity and have a low coefficient of thermal expansion relative to the workholding material.

Although in this preferred embodiment the special filler is used to heat the shuttle and workpiece and to add strength to the workholding material, it is contemplated that the special filler may be added solely for the purpose of increasing strength, whereby the filler is added at room temperature and an oven or the like is used to heat the parts, including the filler.

The following Table I, indicates the holding strength of the wax and ceramic-stone composition of the preferred embodiment at various quench temperatures:

Table I

| Quench Temperature, °F | Holding Strength, lbs. |
| --- | --- |
| 75 | 475 |
| 70 | 875 |
| 65 | 940 |
| 60 | 900 |
| 55 | 850 |

Table I-Continued

| Quench Temperature, °F | Holding Strength, lbs. |
| --- | --- |
| 45 | 775 |
| 35 | 425 |

Holding strength in this table was arbitrarily defined as the force necessary to deflect a one-inch diameter steel rod a distance of 0.001 inch in the particular test shuttle used for the testing. FIG. 2 is a graph of the data of Table I. The sudden drop in holding strength at the upper and lower ends of the quench temperatures tested is evident. From the graph it is clear that greatly increased holding strength is obtained when the quench temperature is between 40° and 73°F, but for the purposes of machining the turbine blade 10 of the preferred embodiment it is desirable to maintain the quench temperature at between 45° and 70°F. Note that in the hereinabove reference McCormick patent the quench was done in ice water (32°F) which results in very low holding strength.

The reason for the sudden increase in holding strength within a narrow temperature band is probably because a quench temperature which is too cool solidifies the wax too quickly and causes stress cracking of the wax; if the quench is too hot it is likely that the wax cools too slowly and shrinkage is greater, wherein intimate contact between the wax and the walls of the shuttle is lost thereby losing holding power.

As stated earlier the machining of turbine blades such as the blade 10 requires very high holding strength on the part of the wax. No commercial wax on the market was strong enough for this particular operation even with the use of the special quenching temperatures hereinabove disclosed. For that reason special fillers of ceramic stone (or glass ball) were used, i.e., to boost the holding strength to acceptable levels. For some operations the special temperature quench disclosed might provide the required additional strength without the use of the ceramic stones or glass balls; this by itself is considered to be a novel advance over the prior art.

Although the invention has been shown and described with respect to a preferred embodiment thereof, it should be understood by those skilled in the art that various changes and omissions in the form and detail thereof may be made therein without departing from the spirit and the scope of the invention.

Having thus described typical embodiments of our invention, that which we claim as new and desired to secure by Letters Patent of the United States is:

1. In the process of securing a workpiece in a workholder the steps of:
   positioning the workpiece within the workholder;
   heating the workpiece and workholder;
   heating to a liquid state a cold quenchable, organic resin, workholding material which has thermoplastic properties and exhibits a strength curve of the same general shape and temperature range as the curve shown in FIG. 2 of the specification;
   disposing said liquid workholding material within the workholder around the workpiece; and
   quenching simultaneously the workholder, workpiece and workholding material by contact with a quenching medium at a temperature of between 40°F and 73°F at least until the workholding material is solid.

2. The process according to claim 1 wherein said quenching temperature is between 45°F and 70°F.

3. The process according to claim 1 wherein the step of heating the workpiece and workholder includes heating a special filler to at least greater than the melting point of the workholding material and disposing said heated filler within said workholder around said workpiece.

4. In the process of securing a workpiece in a workholder the steps of:
   positioning the workpiece within the workholder;
   disposing a special filler within said workholder around said workpiece;
   heating the workpiece, workholder and special filler;
   heating to a liquid state a cold quenchable, organic resin, workholding material which has thermoplastic properties and which exhibits a strength curve of the same general shape and temperature range as the curve shown in FIG. 2 of the specification;
   disposing said liquid workholding material within the workholder around the workpiece; and
   quenching simultaneously the workholder, workpiece and workholding material by contact with a quenching medium at a temperature of between 40°F and 73°F at least until the workholding material is solid.

5. The process according to claim 4 wherein said quenching temperature is between 45°F and 70°F.

6. A process for securing a workpiece in a workholder wherein the workpiece is held in position by a special filler matrix which is bound together by a cold quenchable organic resin, including the steps of:
   positioning the workpiece within the workholder;
   heating the special filler to a temperature greater than the melting point of the organic resin;
   disposing the special filler within the workholder around the workpiece;
   heating to a liquid state a cold quenchable, organic resin, workholding material which has thermoplastic properties and exhibits a strength curve of the same general shape and temperature range as the curve shown in FIG. 2 of the specification;
   disposing said liquid organic resin within the workholder around the workpiece so as to fill the interstices in the special filler; and
   quenching simultaneously the workholder, workpiece and organic resin by contact with a quenching medium at a temperature of between 40° F and 73° F at least until the resin solidifies to hold the workpiece within a solid matrix comprising the special filler which is bound together by the organic resin.

7. The process according to claim 6 wherein said special filler includes particles having a maximum dimension of between one eighth and two tenths inch.

8. The process according to claim 6 wherein said particles are symmetrical.

9. The process according to claim 7 wherein the step of cooling the workholder, workpiece and organic resin comprises quenching at a temperature between 45°F and 70°F.

* * * * *

UNITED STATES PATENT OFFICE
CERTIFICATE OF CORRECTION

PATENT NO. : 3,897,535
DATED : July 29, 1975
INVENTOR(S) : Edward F. Lapac, Joseph F. Miazga and Irving M. Mittleman It is certified that error appears in the above-identified patent and that said Letters Patent are hereby corrected as shown below:

Column 2, line 8: "bells" should read --balls--.

Signed and Sealed this twenty-first Day of October 1975

[SEAL]

Attest:

RUTH C. MASON
*Attesting Officer*

C. MARSHALL DANN
*Commissioner of Patents and Trademarks*